(12) United States Patent
Stock et al.

(10) Patent No.: US 9,331,625 B2
(45) Date of Patent: May 3, 2016

(54) ELECTRONIC DEVICE

(71) Applicant: Robert Bosch GmbH, Stuttgart (DE)

(72) Inventors: Joern Stock, Bempflingen (DE); Kamil Pogorzelski, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 14/300,664

(22) Filed: Jun. 10, 2014

(65) Prior Publication Data

US 2014/0368149 A1 Dec. 18, 2014

(30) Foreign Application Priority Data

Jun. 12, 2013 (DE) .......................... 10 2013 210 926

(51) Int. Cl.
*G05B 19/416* (2006.01)
*H02P 29/00* (2016.01)
*H02P 25/14* (2006.01)

(52) U.S. Cl.
CPC ................ *H02P 29/00* (2013.01); *H02P 25/14* (2013.01)

(58) Field of Classification Search
CPC ............. H02P 29/00; H02P 6/08; H02P 7/06; G05B 19/19; G05B 19/404; B24B 51/00; B25F 5/00
See application file for complete search history.

(56) References Cited

U.S. PATENT DOCUMENTS 5,315,789 A * 5/1994 Takashi ............................. 451/5
2013/0193891 A1* 8/2013 Wood et al. ................... 318/434

* cited by examiner

*Primary Examiner* — Karen Masih
(74) *Attorney, Agent, or Firm* — Maginot, Moore & Beck LLP

(57) ABSTRACT

An electronic device for controlling and/or regulating a drive unit includes a memory configured to make available at least two at least partially different control parameter sets which are each usable to at least one of control and regulate one of at least two drive units. The electronic device further includes a control unit which is configured to select one of the at least two parameter sets of the memory unit as a function of at least one operating parameter of the drive unit.

10 Claims, 2 Drawing Sheets

ELECTRONIC DEVICE

This application claims priority under 35 U.S.C. §119 to patent application no. DE 10 2013 210 926.1, filed on Jun. 12, 2013 in Germany, the disclosure of which is incorporated herein by reference in its entirety.

BACKGROUND

Electronic devices have already been proposed. Today, digital rotation speed counters are supplied with a fixed parameter set. Products with different motors require different parameter sets. Therefore a high variance of electronic devices is required.

SUMMARY

An electronic device is proposed, in particular a hand machine-tool electronic device, which is provided for control and/or regulation of a drive unit, with a memory unit which is provided for making available at least two at least partially different control parameter sets which are each provided for control and/or regulation of one of at least two drive units, and with a control unit which is provided for selection of one of the at least two parameter sets of the memory unit as a function of at least one operating parameter of the drive unit. The memory unit is preferably formed integrally with the control unit, and the electronic device is preferably provided as a complete assembly to be installed in a hand machine-tool. It is however also conceivable that the memory unit is formed by an external assembly such as for example a Notebook, a Netbook, a tablet, an external hard disk unit or another external device which appears suitable to a person skilled in the art, and is configured to be able to be coupled releasably to the control unit. The term "control and/or regulation" in this context means in particular a targeted adaptation of at least one adjustable operating parameter of the drive unit, such as in particular a rotation speed, a torque and/or another operating parameter which appears suitable to a person skilled in the art. The drive unit is preferably formed at least partly by an electric motor, in particular a universal motor. However also other embodiments of the drive unit appearing suitable to a person skilled in the art are conceivable.

The term "at least partially different" in this context means in particular that at least one control parameter of the at least two control parameter sets each has a value which in particular differs by at least 1%, preferably by at least 2%, preferably by at least 5%, and particularly preferably by at least 10% of the greater value in terms of amount. The term "control parameter set" in this context means in particular a group of at least two different control parameters which are each provided for regulation and/or control of at least one function of the hand machine-tool in which the electronic device is incorporated, wherein the control parameters of the control parameter set are matched at least partially to each other and in particular to a design and/or a preferred operating mode of the hand machine-tool. In a particularly preferred exemplary embodiment, the control parameters of the control parameter set are formed respectively by a voltage, a current intensity, an electrical resistance, and/or another control parameter which appears suitable to a person skilled in the art.

The term "as a function of" in this context means in particular caused by and/or determined by and/or decisively influenced by something. The term "operating parameter" in this context in particular means a preferably constant value which can be in particular uniquely associated with the drive unit and which occurs at least in one operating state of the drive unit. Preferably the operating parameter of the drive unit is proposed and/or defined at an idle of the drive unit in which at least substantially no load is present on the drive unit in an operating state. The at least one operating parameter is at least partially formed by a value which is at least partially dependent on the drive unit, at least substantially constant and/or at least partially configured characteristically for the drive unit.

The embodiment according to the disclosure achieves a flexibly and universally applicable, and hence economic electronic device which is provided for control and/or regulation of different drive units and therefore can be installed with different hand machine-tools. Thus a preferably low variance of electronic units for different hand machine-tools can be achieved.

It is furthermore proposed that the at least one operating parameter of the drive unit comprises an ignition point and/or an ignition angle. The term "ignition point" in this context means in particular a time in an operating state of the drive unit at which in particular a triac provided for control of the drive unit is connected, and at which an alternating drive voltage controlled in particular by means of the triac shows a jump-like rise in an amount of the value. The term "ignition angle" in this context in particular means a phase angle between the neutral passage of the network alternating voltage and the ignition point, in particular when a control alternating voltage is present at a gate of the triac. It is however also conceivable that the at least one operating parameter of the drive unit alternatively or additionally comprises a rotation speed, a pulse width modulation, a duty cycle and/or other operating parameter appearing suitable to a person skilled in the art, which in particular uniquely characterize the drive unit. Thus a preferably simple and advantageously reliable detection of the operating parameter and selection of the appropriate control parameter set can be achieved.

Furthermore it is proposed that the control parameter sets are provided in an operating state for rotation speed control of the drive unit. The term "rotation speed control" in this context means in particular a control and/or regulation of the rotation frequency of a rotatably mounted part of the drive unit in one operating state of the drive unit. Hence an advantageous adjustment to a desired operating case can be achieved.

It is also proposed that the control unit comprises at least one memory element which is provided for permanently storing the at least one selected control parameter set and making this available for control and/or regulation of the drive unit. The term "store" in this context means in particular the storage of at least one datum, in particular independently of a power supply, preferably in an electronic memory. Thus in an advantageously simple and reliable way, the appropriate control parameter set can be made available in an operating state.

Furthermore a hand machine-tool is proposed with a drive unit and with an electronic device according to the disclosure. Thus a preferably adaptable embodiment of the hand machine-tool can be achieved.

It is also proposed that the drive unit is formed at least partially by an electric motor. Preferably the electric motor is formed by a universal motor. However other embodiments of the electric motor are conceivable which appear suitable to a person skilled in the art. In this way a structurally simple, user-friendly embodiment of the hand machine-tool can be achieved.

Furthermore a system is proposed with at least two substantially different hand machine-tools according to the disclosure, which each comprise an electronic device according to the disclosure. The different hand machine-tools may be formed by angle grinders of different sizes, screwdrivers, drills and/or impact drills, drilling and/or impact hammers, and/or other hand machine-tools which appear suitable to the person skilled in the art. In this way an advantageously low variance of the electronic devices for different hand machine-tools can be achieved.

Furthermore the disclosure is based on a method for control and/or regulation of the drive unit of a hand machine-tool according to the disclosure by means of an electronic device according to the disclosure. In this way, a preferably reliable and advantageously precise control and/or regulation of the drive unit can be achieved.

It is also proposed that the method comprises at least one method step in which an operating parameter of the drive unit in an operating state is detected, and at least one further method step in which a control unit selects one of the at least two control parameter sets as a function of the at least one operating parameter of the drive unit. Preferably the suitable control parameter set is selected on first operation of the hand machine-tool. In this way, a preferably simple embodiment can be achieved.

It is also proposed that the method comprises at least one further method step in which the one selected control parameter set is permanently stored in a memory element of the control unit.

Preferably, on each operation following the first operation, the control unit retrieves the control parameter set stored in the memory element. In this way, an advantageously reliable and structurally simple embodiment can be achieved.

It is furthermore proposed that the method comprises at least one further method step in which the drive unit is at least partially controlled and/or regulated by the control unit as a function of the one selected control parameter set. In this way, an advantageously reliable and preferably precise operation of the hand machine-tool can be achieved.

It is also proposed that in the at least one further method step, at least one rotation speed of the drive unit is at least partially controlled and/or regulated by the control unit as a function of the one selected control parameter set. The term "rotation speed" in this context means in particular a rotation frequency of a rotatably mounted part of the drive unit in an operating state of the drive unit. In this way, an advantageous adaptation of the drive unit to a desired operating case can be achieved.

The electronic device according to the disclosure is not restricted to the application and embodiment described above. In particular, the electronic device according to the disclosure, in order to fulfill a function described herein, may comprise a number of individual elements, components and units which differs from the number cited herein.

BRIEF DESCRIPTION OF THE DRAWINGS

Further advantages arise from the drawing description below. The drawing depicts an exemplary embodiment of the disclosure. The drawing, description and claims contain numerous features in combination. The person skilled in the art will also consider the features individually where suitable and combine these into further sensible combinations.

In the drawings.

DETAILED DESCRIPTION

Figure 1:
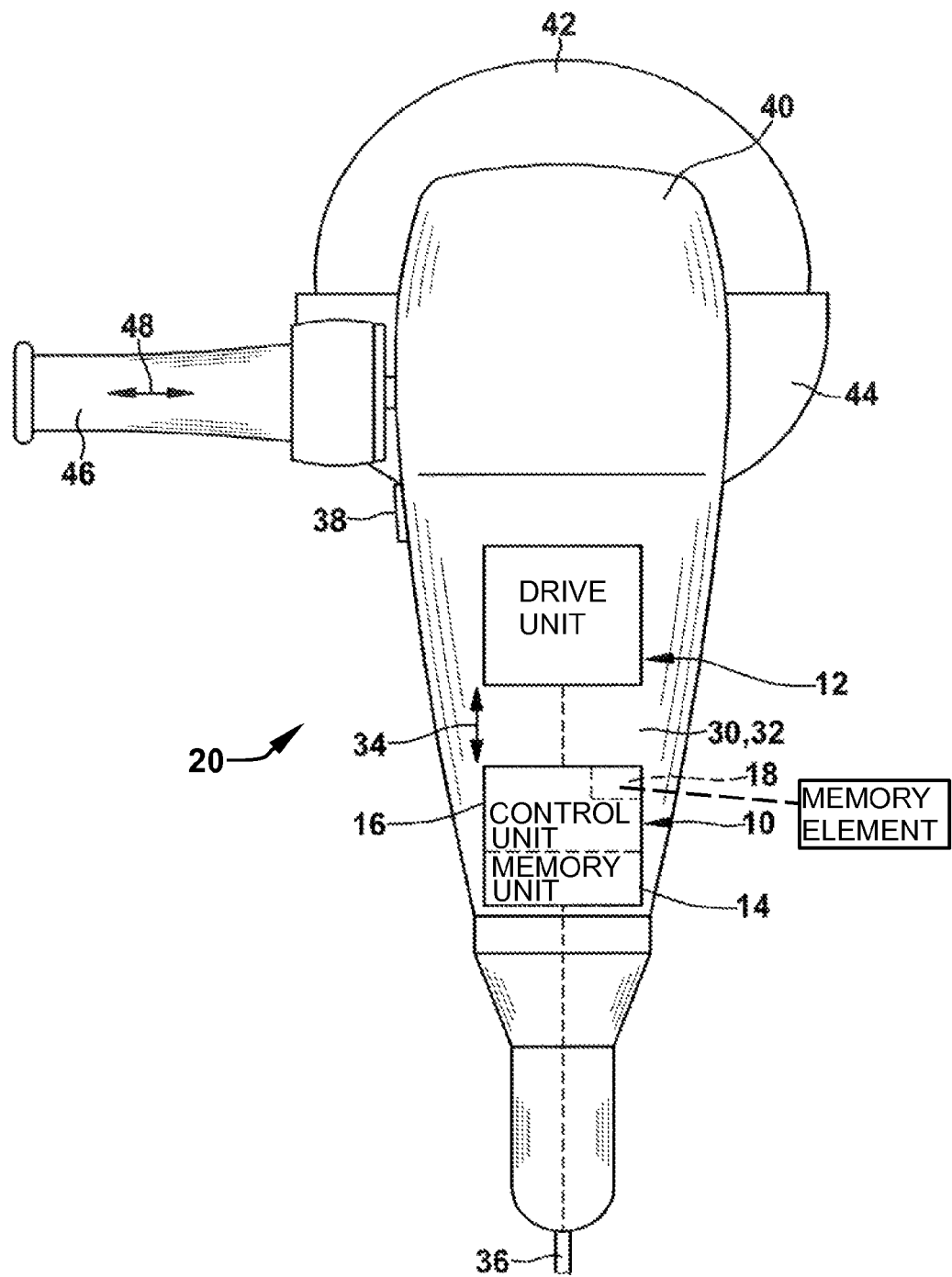
FIG. 1 shows a hand machine-tool according to the disclosure with an electronic device according to the disclosure, in a diagrammatic top view.
Figure 2:
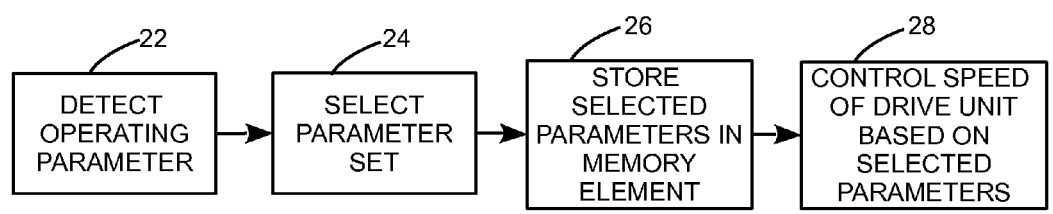
FIG. 2 shows a block circuit diagram of a method according to the disclosure for control and/or regulation of a drive unit of the hand machine-tool according to the disclosure by means of the electronic device.

FIG. 1 shows a hand machine-tool 20. The hand machine-tool 20 is formed by an angle grinder. However other embodiments of the hand machine-tool 20 which appear suitable to a person skilled in the art are conceivable, such as for example an electric drill, a hammer drill, an oscillation hand machine-tool or an orbital sander. The hand machine-tool 20 comprises a housing 30. The housing 30 is made of plastic. The housing 30 forms a main handle 32 which is provided to be gripped by the hand of a user. In the main extension direction 34 of the hand machine-tool 20, a power cable 36 is arranged at one end of the housing 30. The power cable 36 is provided for supply of electrical energy to the drive unit 12 of the hand machine-tool 20 via a power pack. The power cable 36 is provided to be connected to an electrical power network. For this the power cable 36 has a plug element (not shown). It is however also conceivable that the hand machine-tool 20 is formed by a battery-powered hand machine-tool. The hand machine-tool 20 furthermore has a switch element 38 which is designed to be operated by a user. The switch element 38 is provided for activating the drive unit 12. The switch element 38 is formed by a switch trigger.

The hand machine-tool 20 furthermore has a gear casing 40. The gear casing 40 is connected to the housing 30 at an end of the housing 30 opposite the power cable 36. The gear casing 40 is made of metal. The gear casing 40 is made of aluminum. The hand machine-tool 20 comprises a tool holder (not shown in more detail) which is provided to receive an insert tool 42 and hold this captively. The insert tool 42 is formed by a sanding disk. The insert tool 42 is releasably connected to the tool holder. The tool holder, viewed vertically to the main extension direction 34 of the hand machine-tool 20, is arranged at an open end of the gear casing 40. The tool holder protrudes out of the gear casing 40. Also a protective hood 44 is coupled to a flange of the gear casing 40. The protective hood 44 is releasably connected to the hand machine-tool 20.

The hand machine-tool 20 also has an additional handle 46. The additional handle 46 is provided to be gripped by a further hand of the user. The additional handle 46 is releasably coupled to the hand machine-tool 20. In the state wherein the additional handle 46 is mounted on the hand machine-tool 20, a main extension direction 48 of the additional handle 46 runs vertically to the main extension direction 34 of the hand machine-tool 20 and parallel to a main extension plane of the insert tool 42.

The hand machine-tool comprises the drive unit 12 and an electronic device 10 which is provided for control or regulation of the drive unit 12. The housing 30 of the hand machine-tool 20 surrounds the drive unit 12 and the electronic device 10. The drive unit 12 comprises an electric motor. The drive unit 12 comprises a universal motor. The drive unit 12 has an output shaft (not shown) which is connected to a drive shaft via a gear unit. The gear unit has an angular gear (not shown). The drive shaft is provided for driving the insert tool 42 which is coupled to the tool holder. The drive unit 12 is actively connected to the electronic device 10. The drive unit 12 is electronically connected to the electronic device 10.

The electronic device 10 comprises a control unit 16. The control unit 16 is provided for control or regulation of the drive unit 12. The control unit 16 can also, alternatively or additionally, be provided for control or regulation of a further function unit appearing suitable to a person skilled in the art. The control unit 16 is provided for control or regulation of a rotation speed of the drive unit 12. The control unit 16 forms a rotation speed control unit. The control unit 16 has a rotation speed detection unit which is provided to detect a rotation speed of the drive unit 12 in an operating state. To control the drive unit 12, the control unit 16 comprises a bidirectional thyristor triode or a symistor (triac). The control unit 16 also comprises a microcontroller which is provided for control or regulation of the drive unit 12. The electronic device 10 also comprises a memory unit 14. The memory unit 14 is provided for making available several different control parameter sets which are each provided for control or regulation of one of several different drive units 12. The memory unit 14 is provided for permanent storage of the control parameter sets. Alternatively however it is also conceivable that the memory unit 14 is provided for temporary storage of the control parameter sets. The memory unit 14 is arranged inside the hand machine-tool 20 and is configured integrated therein. Alternatively it is however also conceivable that the memory unit 14 is formed at least partially separately from the hand machine-tool and formed by an external device such as in particular a Notebook, a Netbook, a tablet, an external hard disk unit or another external device appearing suitable to a person skilled in the art. The control unit 16 of the electronic device 10 is provided for selection of one of the control parameter sets of the memory unit 14 as a function of one or more parameters of the drive unit 12.

Figure 3:
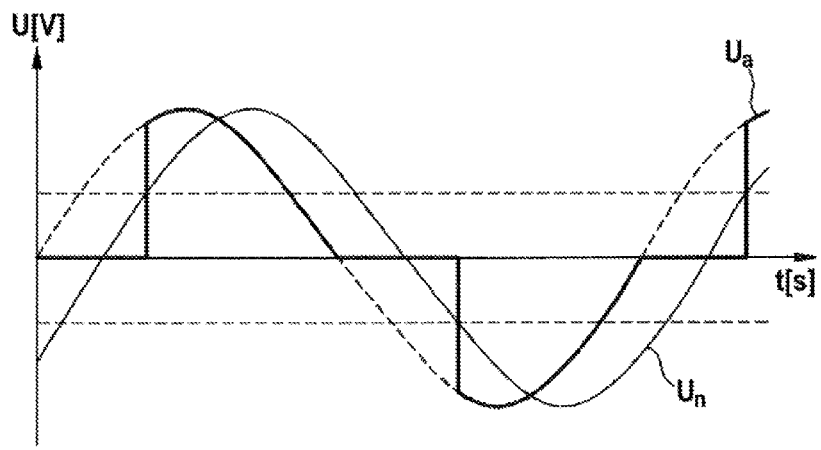
FIG. 3 shows a voltage development in the hand machine-tool according to the disclosure in an operating state, in a diagram.

The operating parameter of the drive unit 12 is formed by an ignition point of the drive unit 12. Alternatively or additionally, it is also conceivable that the operating parameter of the drive unit 12 is formed by an ignition angle of the drive unit 12 or by another parameter which appears suitable to a person skilled in the art and is at least partially dependent on the drive unit 12. The operating parameter of the drive unit 12 is detected at an idle of the hand machine-tool 20 in which the drive unit 12 is set to a defined idle rotation speed. The ignition point of the drive unit 12 is defined by a time at which the bidirectional thyristor triode (triac) connects. The bidirectional thyristor triode connects when an amount of an alternating voltage $U_n$, which runs phase-offset to the network voltage with which the hand machine-tool 20 is driven, exceeds a limit value. Thus a phase control can be achieved. As long as the amount of the follow-on alternating voltage $U_n$ runs below the limit value, the bidirectional thyristor triode constitutes a high-ohmic resistance and blocks the network voltage. As soon as the amount of the follow-on alternating voltage $U_n$ runs above the limit value, the bidirectional thyristor triode constitutes a low-ohmic resistance and conducts the network voltage. This gives a characteristic development of the drive alternating voltage $U_a$ of the drive unit 12 resulting from the network voltage (FIG. 3). This characteristic of the drive unit 12 is detected by the control unit 16. Alternatively it is also conceivable that the drive alternating voltage $U_a$ of the drive unit 12 is designed to be controllable via a microcontroller, whereby the follow-on alternating voltage $U_n$ may be omitted.

The control unit 16 is electronically connected to the memory unit 14. The memory unit 14 stores an association between the characteristic of the drive unit 12, such as the ignition point and the associated control parameter set, and the respective control parameter sets. From the characteristic of the drive unit 12, the control unit 16 selects the control parameter set suitable for the drive unit 12. The selected control parameter set is provided in an operating state of the hand machine-tool 20 for rotation speed control of the drive unit 12. The control unit 16 comprises a memory element 18 which is provided for permanent storage of the selected control parameter set provided by the memory unit 14, and for making this available for control and/or regulation of the drive unit 12.

On first operation of the hand machine-tool 20 after production and assembly of the hand machine-tool 20, in a first method step 22, an operating parameter of the drive unit 12 is detected by the control unit 16, whereby the control unit 16 can detect the drive unit 12, and in a further method step 24 the control parameter set suitable for the hand machine-tool is selected, and in a further method step 26 stored permanently in the memory element 18 of the control unit 16. A further method step 28 is provided in which the drive unit 12 is controlled by the control unit 16 as a function of the selected control parameter set in each subsequent operating state. In the further method step 28, the control unit 16 controls or regulates the rotation speed of the drive unit 12 as a function of the selected control parameter set.

What is claimed is:

1. An electronic device for at least one of control and regulation of a drive unit, comprising:
   a memory unit configured to make available at least two at least partially different control parameter sets, each of which is usable for at least one of control and regulation of one of at least two drive units, wherein at least one operating parameter in each of the control parameter sets corresponds to at least one of an ignition point and an ignition angle; and
   a control unit configured to select one of the at least two parameter sets as a function of at least one operating parameter of the drive unit.

2. The electronic device according to claim 1, wherein the at least two parameter sets are made available in an operating state of the drive unit such that a rotational speed of the drive unit is controllable.

3. The electronic device according to claim 1, wherein the control unit includes at least one memory element configured to permanently store a selected one of the at least two parameter sets and make available the selected one of the at least two parameter sets in order to at least one of control and regulate the drive unit.

4. A hand machine-tool, comprising:
   a drive unit; and
   an electronic device configured to at least one of control and regulate the drive unit, and including:
      a memory unit configured to make available at least two at least partially different control parameter sets, each of which is usable for at least one of control and regulation of one of at least two drive units, wherein at least one operating parameter in each of the control parameter sets stored in the memory unit corresponds to at least one of an ignition point and an ignition angle; and
      a control unit configured to select one of the at least two parameter sets as a function of at least one operating parameter of the drive unit.

5. The hand machine-tool according to claim 4, wherein the drive unit includes an electric motor.

6. The hand machine-tool according to claim 4, wherein the hand machine-tool is comprised by a system having at least two substantially different hand machine-tools which each comprise a respective one of the electronic device.

7. A method for at least one of control and regulation of a drive unit of a hand machine tool via an electronic device that includes a memory unit and a control unit, comprising:
   detecting, in an operating state of the drive unit, an operating parameter of the drive unit; and selecting, as a function of the at least one operating parameter, and via the control unit, one of at least two at least partially different control parameter sets made available by the memory unit, wherein each of the at least two parameter sets is configured for at least one of control and regulation of one of at least two drive units and at least one operating parameter in each of the control parameter sets corresponds to at least one of an ignition point and an ignition angle.

8. The method according to claim 7, further comprising permanently storing a selected one of the at least two parameter sets in a memory element of the control unit.

9. The method according to claim 7, further comprising at least one of at least partially controlling and at least partially regulating the drive unit via the control unit as a function of the selected one of the at least two parameter sets.

10. The method according to claim 9, further comprising at least one of at least partially controlling and at least partially regulating a rotation speed of the drive unit via the control unit as a function of the selected one of the at least two parameter sets.

* * * * *